(12) United States Patent
Ikeda et al.

(10) Patent No.: US 7,559,340 B2
(45) Date of Patent: Jul. 14, 2009

(54) TUBE TYPE CABLE PROTECTION AND GUIDE DEVICE

(75) Inventors: Masaaki Ikeda, Osaka (JP); Shoichiro Komiya, Osaka (JP); Katsuhide Yamashita, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 5 days.

(21) Appl. No.: 12/024,805

(22) Filed: Feb. 1, 2008

(65) Prior Publication Data

US 2008/0257440 A1 Oct. 23, 2008

(30) Foreign Application Priority Data

Apr. 17, 2007 (JP) ............................. 2007-108498

(51) Int. Cl.
*F16L 11/18* (2006.01)
*H02G 3/04* (2006.01)

(52) U.S. Cl. ................... 138/110; 138/165; 138/120; 138/108; 138/155; 59/78.1; 59/900; 248/51; 248/49; 174/24

(58) Field of Classification Search ................ 138/110, 138/108, 120, 155, 118, 165–168, 162; 248/49, 248/51; 59/78.1, 900; 174/24, 19
See application file for complete search history.

(56) References Cited

U.S. PATENT DOCUMENTS

| | | | | |
|---|---|---|---|---|
| 1,984,232 A * | 12/1934 | Peremi et al. ............... 138/165 |
| 3,517,702 A * | 6/1970 | Mueller et al. .............. 138/128 |
| 4,647,715 A * | 3/1987 | Butler ......................... 174/41 |
| 5,411,443 A * | 5/1995 | Meier et al. ................. 474/145 |
| 5,905,231 A * | 5/1999 | Houte et al. ............... 174/68.3 |
| 6,032,702 A * | 3/2000 | Bearden ..................... 138/166 |
| 6,161,373 A | 12/2000 | Heidrich et al. |
| 6,459,037 B2 * | 10/2002 | Muller et al. ................ 174/19 |
| 6,708,480 B1 * | 3/2004 | Wehler ...................... 59/78.1 |
| 6,966,527 B2 * | 11/2005 | Komiya ....................... 248/49 |
| 7,418,812 B2 * | 9/2008 | Ikeda et al. ................. 59/78.1 |
| 2001/0025715 A1 | 10/2001 | Muller et al. |
| 2008/0017397 A1 | 1/2008 | Komiya |

FOREIGN PATENT DOCUMENTS

| | | |
|---|---|---|
| JP | 10-028310 | 1/1998 |
| JP | 10-047441 | 2/1998 |

(Continued)

OTHER PUBLICATIONS

U.S. Appl. No. 11/828,537, Ikeda.

(Continued)

*Primary Examiner*—Patrick F Brinson
(74) *Attorney, Agent, or Firm*—Woodling, Krost and Rust

(57) ABSTRACT

A tube type cable protection and guide device in which the device can be easily manufactured by extrusion molding without changing the size of a mold so that devices of different lengths can be made. Smooth linear and flexional movements can be made while sufficiently ensuring dimensional stability and torsional rigidity of the device thus assuring stability of the cable accommodating space. A tube type cable protection and guide device includes integrally molded inner circumferential wall forming portions. The inner wall forming portions are interdigitatedly fitted in a male-female relationship in a longitudinal direction of the sheet forming a flush inner flat surface.

12 Claims, 9 Drawing Sheets

FOREIGN PATENT DOCUMENTS

| | | |
|---|---|---|
| JP | 2001514725 | 9/2001 |
| JP | 2004159406 | 3/2004 |
| JP | 2007508797 | 4/2007 |
| JP | 2007-108498 | 3/2009 |
| WO | 9840645 | 9/1998 |
| WO | WO 98/40645 | 9/1998 |
| WO | 2005040659 | 6/2005 |

OTHER PUBLICATIONS

U.S. Appl. No. 11/781,113, Komiya.

* cited by examiner

TUBE TYPE CABLE PROTECTION AND GUIDE DEVICE

This patent application claims priority to Japanese Patent Application Serial No. 2007-108498 filed Apr. 17, 2007

TECHNICAL FIELD

The present invention relates to a cable or the like protection and guide device. More specifically, the present invention relates to a tube type cable protection and guide device suitable for accommodating a cable in a cable accommodating space. By way of example, a cable(s), a hose(s) or the like, supplies a movable member of a semiconductor production device, a pharmacy development testing device, a vehicle door opening/closing device, a vehicle slide seat, or a vehicle electric sunroof or the like with electric power. The electric energy of energy in the form of compressed air is carried within cables or hoses and is safely and reliably guided and protected during movement.

BACKGROUND TECHNOLOGY

A conventional cable or the like protection and guide device is illustrated and described in Patent Reference 1 identified below. A cable hose protection and guide chain illustrated Patent Reference 1 is known and includes upper edge portions and lower edge portions. A pair of spaced and opposed link plates having the same shape are connected to each other with a flap and a bottom plate used as connecting members.

A foldable protection element as set forth in Patent Reference 2 identified below is known and is composed of segments injection-molded or cast into a substantially flat structure by one piece from a synthetic substance and connected to each other by a flexible bridge.

Patent Reference 1 is Japanese Laid-Open Patent Publication No. Hei. 10-47441.

Patent Reference 2 is Japanese Patent Marking Publication No. 2001-514725.

Problems to be Solved by the Invention

However, in the protection and guide chain described in the patent reference 1, a number of link plates and flaps and bottom plates, which are their connecting members, must be reliably connected to each other in a longitudinal direction of the chain. Thus there are problems because the structure is complicated and requires numerous components.

Further, since the foldable protection element described in patent reference 2 is injection-molded or cast by one piece, when a wide or long protection and guide device is required, the mold cannot be easily manufactured because there are a physical restrictions and limitations of the mold size. Further, injection molding has further restrictions such as temperature control during the molding process. Further, the cost of long and/or long and wide molds is prohibitive. Further, assembly of the known product is difficult.

Thus, the present invention solves the above-mentioned problems of manufacturing long and/or long and wide cable protection and guide devices by providing a tube type cable or the like protection and guide device easily manufactured by extrusion molding without changing the size of the mold so that assembly is easy. Further, the cable protection and guide device may be moved linearly and flexionally while dimensional stability and torsional rigidity is maintained.

Means for Solving the Problems

The present invention attains the above-mentioned objects. A tube type cable or the like protection and guide device is formed such that a cable or the like is accommodated in a cable accommodating space. An extrusion molded elongated elastomer resin sheet is folded on both sides along a longitudinal direction of the sheet. The elastomer resin sheet includes outer circumferential wall forming portions which adjacently engage each other in a longitudinal direction of the sheet during linear movement and are separated from each other at predetermined pitches in the longitudinal direction of the sheet during flexional movement. A pair of right and left side wall forming portions are continuously disposed on both sides of the outer circumferential wall forming portion so that the side wall forming portions adjacently engage each other in the longitudinal direction of the sheet during linear movement. The side wall forming portions are separated from each other at predetermined pitches in the longitudinal direction of the sheet during flexional movement. Inner circumferential wall forming portions are integrally molded with the pair of right and left side wall forming portions in a hung state and form a flush inner flat surface oppositely disposed on the outer circumferential wall forming portion by closing the inner circumferential wall forming portions while being interdigitatedly fitted to each other along a longitudinal direction of the sheet.

The tube type cable protection and guide device attains the above-mentioned objects in that the elastomer resin sheet is folded into a pair of right and left folded portions extended in a longitudinal direction of the sheet along both sides of said outer circumferential wall forming portion to form a cable accommodating space of a rectangular section.

The tube type cable protection and guide device attains the above-mentioned objects in that a split slit separates the outer circumferential forming portions and the pair of right and left wall forming portions of the elastomer resin sheet from each other at predetermined pitches in the longitudinal direction of the sheet. The split slit traverses at the predetermined pitches and splits the outer circumferential forming portion and the pair of right and left wall forming portions of said elastomer resin sheet during flexional movement while the pair of right and left inner circumferential forming portions remain engaged.

The tube type cable protection and guide device attains the above-mentioned objects in that a concave portion/convex portion engagement mechanism is provided at front and rear positions through the split slit in the outer circumferential wall forming portion and restricts a lateral shift during linear movement.

The tube type cable or the like protection and guide device further attains the above-mentioned objects in that the folded portion includes an arc-shaped groove or a V-shaped groove opened extending along in the longitudinal direction of the inside of the sheet to be folded.

The tube type cable or the like protection and guide device further attains the above-mentioned objects in that the folded portion is molded of a soft elastomer resin.

The tube type cable or the like protection and guide device further attains the above-mentioned objected in that the inner circumferential wall forming portion is integrally molded by multi-color molding using a synthetic polymer resin different from the elastomer resin.

Effects of the Invention

First, a cable accommodating space is formed by folding an extrusion molded elongated elastomer resin sheet on both sides thereof in the longitudinal direction of the sheet. Linear and flexional movements of the cable protection and guide device are repeated. Even if the cable for a particular application is long, a cable protection and guide device may be manufactured to accommodate a long cable. An elastomer resin sheet is extruded to the optimal length required and is a continuous integrated body. Thus, assembly is easy and connection of a number of link plates such as those found in a conventional cable protection and guide device to a specific desired length is unnecessary.

The elastomer resin sheet is continuously extrusion molded irrespective of the length of a cable or the like to be accommodated into a cable accommodating space. As such, various mold sizes for injection molding or casting in accordance with the desired length of a specific cable are not necessary. Even if the elastomer resin sheet is long, it can be easily manufactured without changing the mold size for extrusion molding.

Further, the elastomer resin sheet includes outer circumferential wall forming portions which adjacently engage each other in a longitudinal direction of the sheet during linear movement. The outer circumferential wall forming portions of the elastomer resin sheet are separated from each other at predetermined pitches in the longitudinal direction of the sheet during flexional movement. The elastomer resin sheet further includes a pair of right and left side wall forming portions. The outer circumferential wall forming portion and the pair of right and left side wall forming portions are respectively separated from each other in accordance with a radius during flexional movement. Therefore, smooth flexional movement can be attained.

Further, the elastomer resin sheet includes inner circumferential wall forming portions integrally molded with the pair of right and left side wall forming portions. The inner circumferential wall forming portions are interdigitatedly fitted to each other in a longitudinal direction of the sheet forming a cable accommodating space. Opening and closing of the inner circumferential wall forming portions which may be interdigitatedly fitted to each other is easy. The inner circumferential wall forming portions form a flush inner flat surface when they are interdigitatedly fitted to each other.

Thus the cable can be easily accessed. At the same time compressive stress due to the flexional deformation of the cable during flexional movement and the weight of the cable acts on the interdigitatedly fitted inner circumferential wall forming portions so that the fitting force of the interdigitated fitting is improved. Therefore, the dimensional stability and torsional rigidity of the inner and outer circumferential wall forming portions are ensured and thus the cable accommodating space is maintained during both linear and flexional movement.

Further, the elastomer resin sheet includes an inner circumferential wall forming portions which join in a flush manner forming an inner flat surface. The inner flat surface is formed in the cable accommodating space and does interfere with the protection and guidance of the cable during both linear movement and flexional movement.

The tube type cable protection and guide device includes an elastomer resin sheet folded into a pair of right and left pair of folded portions. The folded portions extend in a longitudinal direction of the sheet along both sides of the outer circumferential wall forming portion to form a cable accommodating space of a rectangular section. The elastomer resin sheet is folded through a folding portion which decreases resilience after folding. Thus a cable accommodating space of a rectangular cross section can be uniformly and reliably assembled in accordance with a predetermined size in the longitudinal direction of the sheet.

Further, the tube type cable protection and guide device includes a split slit which separates the outer circumferential forming portion and the pair of right and left wall forming portions of said elastomer resin sheet from each other at predetermined pitches in the longitudinal direction of the sheet during flexional movement. The split slit traverses the outer circumferential wall folding portions at predetermined pitches and splits the outer circumferential forming portion and the pair of right and left wall forming portions of the elastomer resin sheet while leaving a pair of right and left inner circumferential forming portions in tact. Flexional pitches for forming the cable accommodating space can be variously changed. The pair of right and left inner circumferential wall forming portions form a stable flexional path during the flexional movement so that the cable can be supported during flexional movement.

Further, the tube type cable protection and guide device includes a concave portion/convex portion engagement mechanism at front and rear positions through the split slit in the outer circumferential wall forming portion which restricts a lateral shift during linear movement. The form of the concave/convex engagement mechanism can be variously changed. Additionally, the concave/convex engagement mechanism restricts a lateral shift of the outer circumferential wall forming portion at front and rear positions through the split slit so that snaking movement is avoided and smooth linear movement can be attained.

Further, the tube type cable protection and guide device includes a folded portion comprising an arc-shaped groove or a V-shaped groove. The arc-shaped or V-shaped groove is open on the inside of the fold and extends along the longitudinal direction of the sheet. A cable accommodating space of rectangular cross-section can be reliably shaped for reducing the resilience at the time of folding.

Further, the tube type cable protection and guide device includes folded portion molded of a soft elastomer resin. The folded portion relatively exhibits more flexibility than the outer circumferential wall forming portion and the side wall forming portion so that resilience, which is generated at the time of folding, is reduced. Thus, a folding load during the flexional movement can be reduced.

Additionally, the tube type cable protection and guide device includes an inner circumferential wall forming portion integrally molded by multi-color molding using a synthetic polymer resin different from the elastomer resin. The fitting force of the inner circumferential wall forming portions can be adjusted. Thus, various tube type cable protection and guide devices can be produced which accommodate various cables.

Even if the cable to be accommodated into a cable accommodating space is long body, a tube type cable protection and guide device is easily manufactured by extruding and then punching the extrusion with no need for the use of different sizes of the mold. The inner and outer circumferential wall forming portions are stable and torsionally rigid. The inner and outer circumferential wall forming portions in turn form the cable accommodating space which is able to maintain a rectangular in cross-sectional shape during linear movement and flexional movement of the cable protection and guide device. The cable and guide device is formed by folding an extrusion molded elongated elastomer resin sheet on both sides thereof in a longitudinal direction of the sheet.

First, the inner circumferential wall forming portions in the tube type cable protection and guide device of the present invention are integrally molded in a pair of right and left side wall forming portions. The inner circumferential wall forming portions are interdigitatedly fitted to each other along a longitudinal direction of the sheet and form a cable accommodating space. Different embodiments of the inner circumferential wall forming portions may be used. Different embodiments of the interdigitated fitting may be used.

A pair of right and left folded portions in an elastomer resin sheet in the tube type cable protection and guide device of the present invention can have a folded form such that the folded portions are perpendicularly provided on the outer circumferential wall forming portions. Particularly, in a case of a folded form in which the inside of the cable accommodating space is arc-shaped, resilience after folding liable to occur between the outer circumferential forming portion and the side wall forming portion is decreased.

Further, the materials of the outer circumferential forming portion, the side wall forming portion and the inner circumferential forming portion in the tube type cable protection and guide device of the present invention are preferably a polyester series resin or an olefin series elastomer resin. Other materials may be used. Further, the material of the inner circumferential wall forming portion may be selected and controlled so as to control the fitting force for the inner circumferential wall forming portion in accordance with the number of accommodated cables used. Integral molding using multi-color molding in which the material of the inner circumferential wall forming portion is differentiated from the materials of the outer circumferential wall forming portion and the side wall forming portion may be used for identification of the properties of the cable protection and guide device.

DESCRIPTION OF THE INVENTION

EXAMPLE

A tube type cable protection and guide device, which is an example according to the present invention, will be described with reference to FIGS. 1 to 8 hereinbelow.

Figure 1:
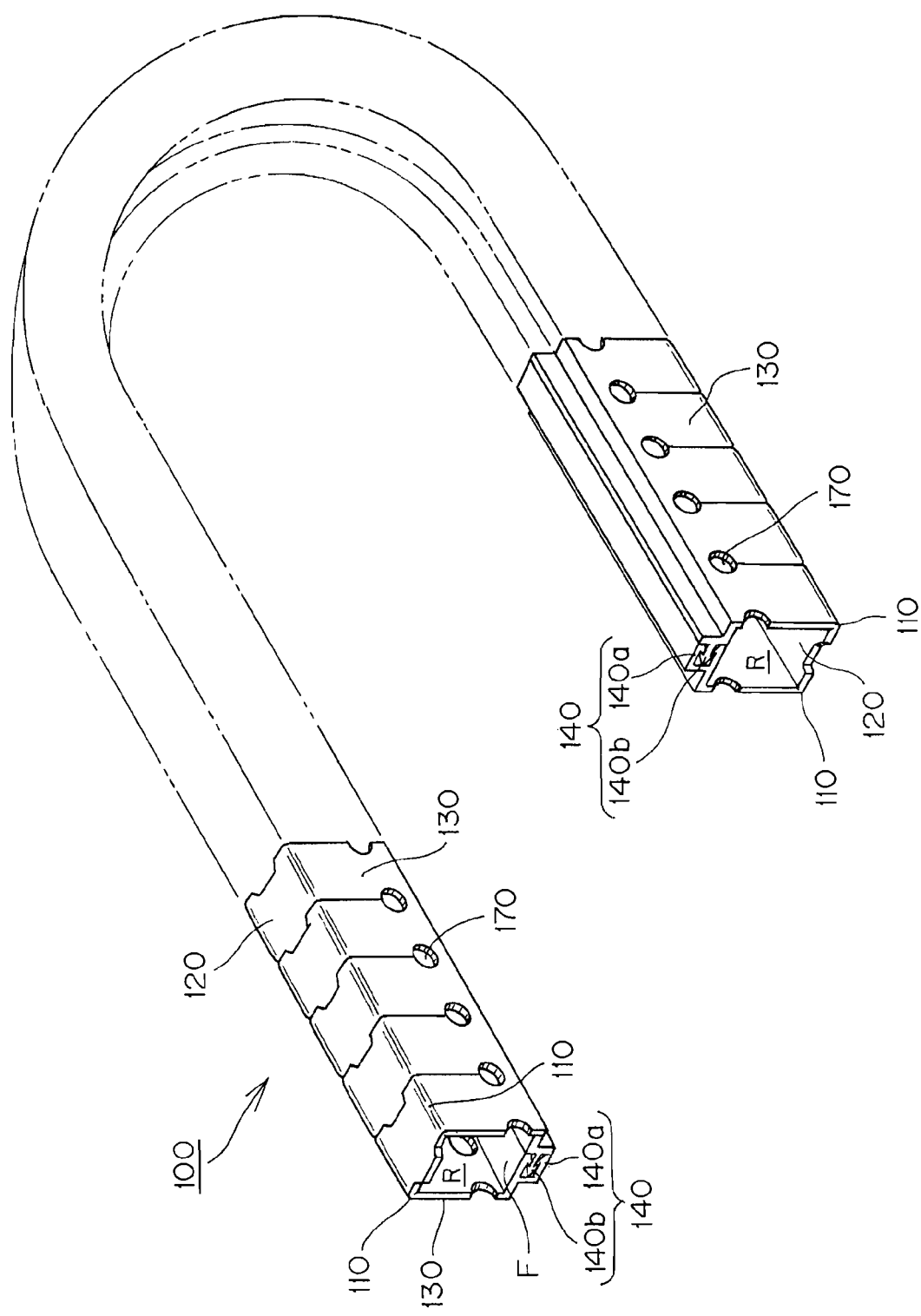
FIG. 1 is a whole view of a cable or the like protection and guide device, which is a first example of according to the present invention.
Figure 2:
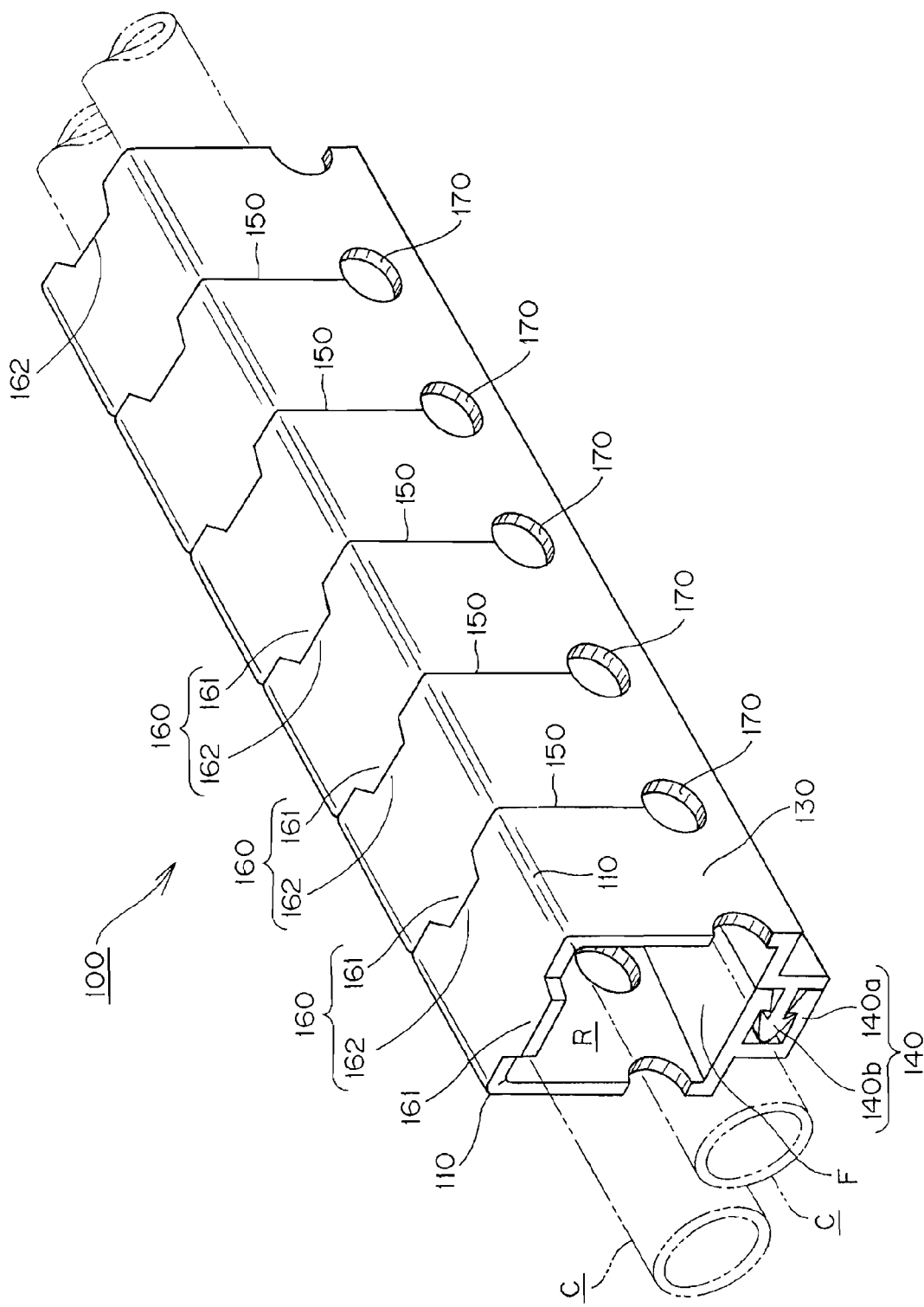
FIG. 2 is an enlarged perspective view of a linear state of FIG. 1.
Figure 3:
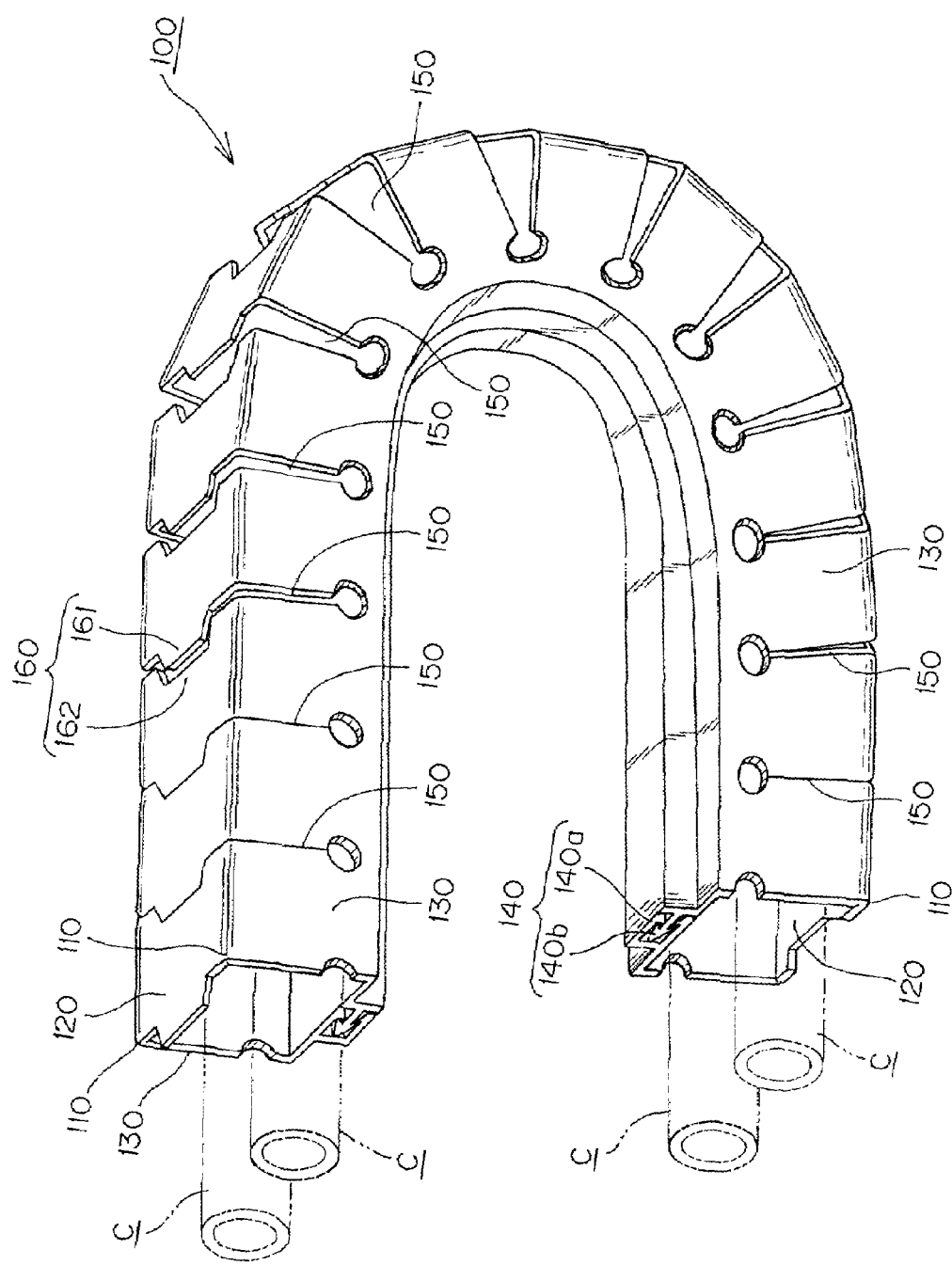
FIG. 3 is an enlarged perspective view of a flexed state of FIG. 1.
Figure 4:
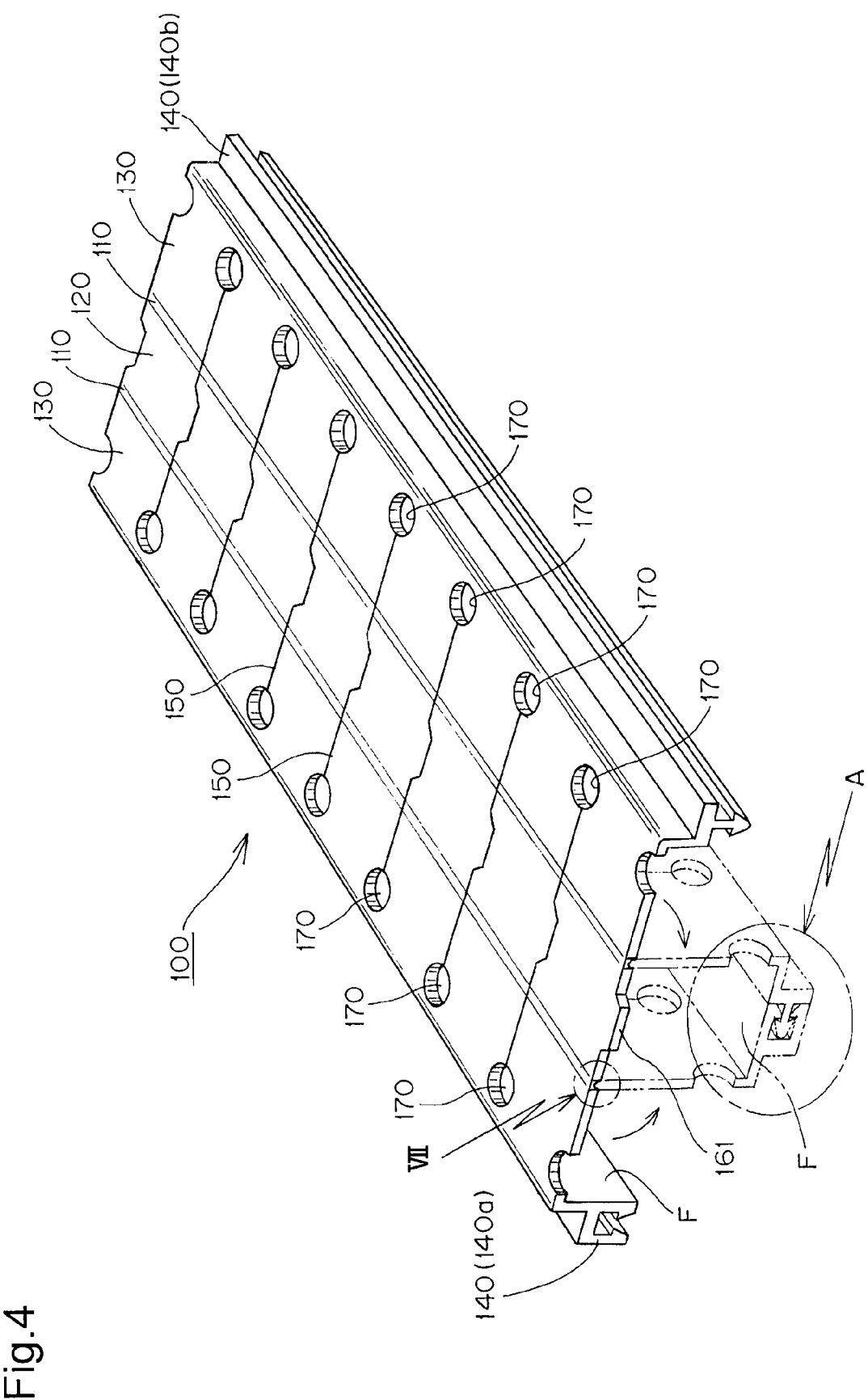
FIG. 4 is a development view of an elastomer resin sheet used in FIG. 1.
Figure 5:
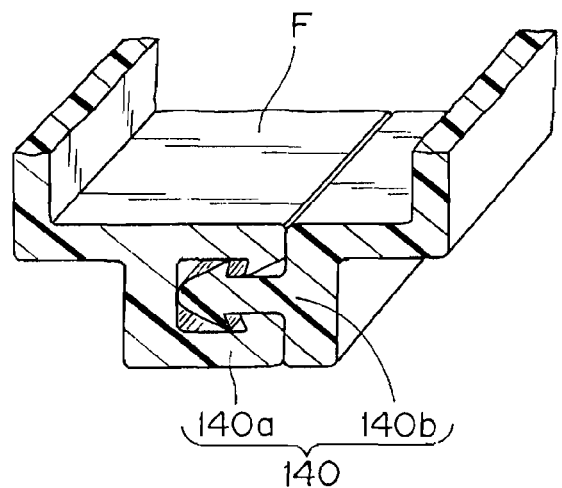
FIG. 5 is an enlarged view of a modified example showing the portion A in FIG. 4.
Figure 5:
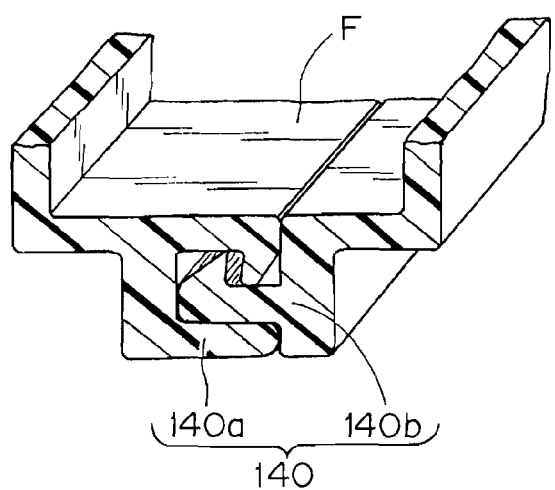
Figure 5:
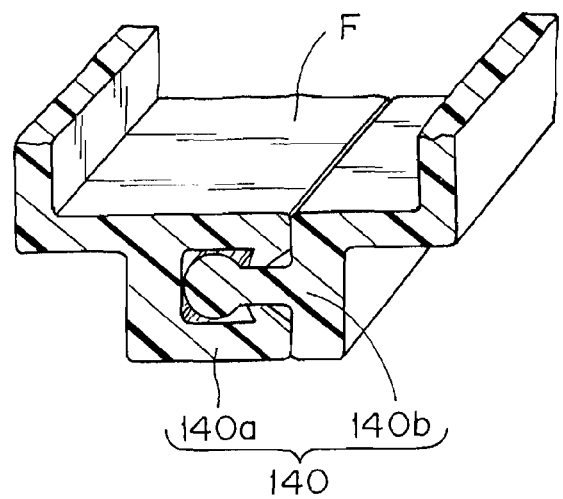
Figure 6:
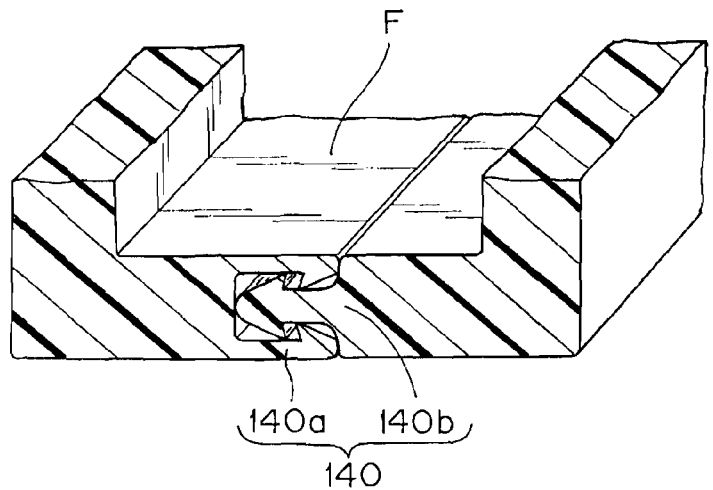
FIG. 6 is an enlarged view of another modified example showing the portion A in FIG. 4.
Figure 6:
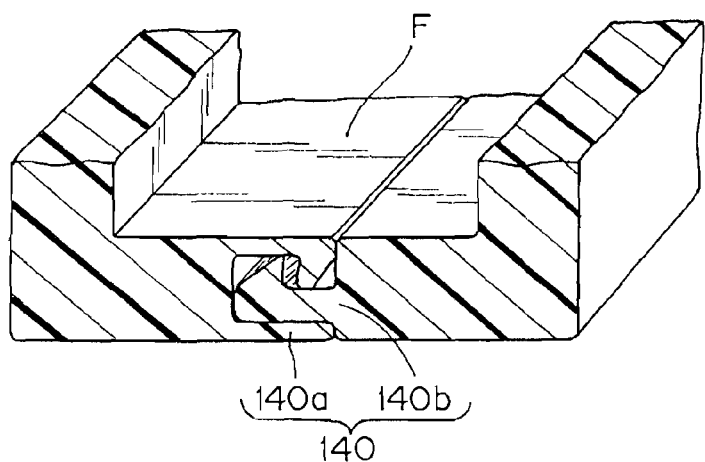
Figure 6:
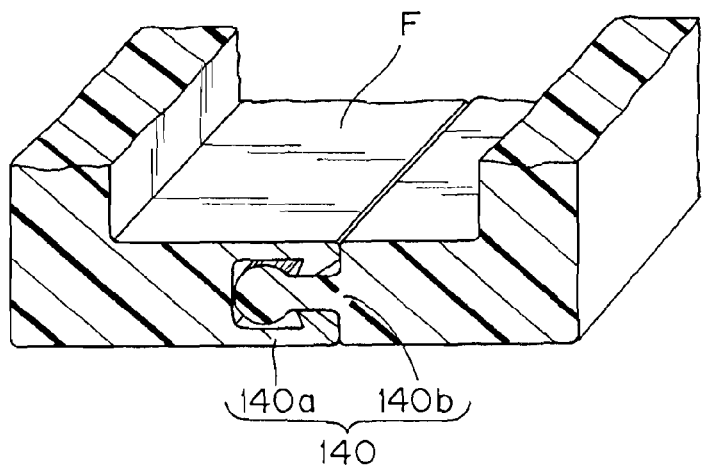
Figure 7:
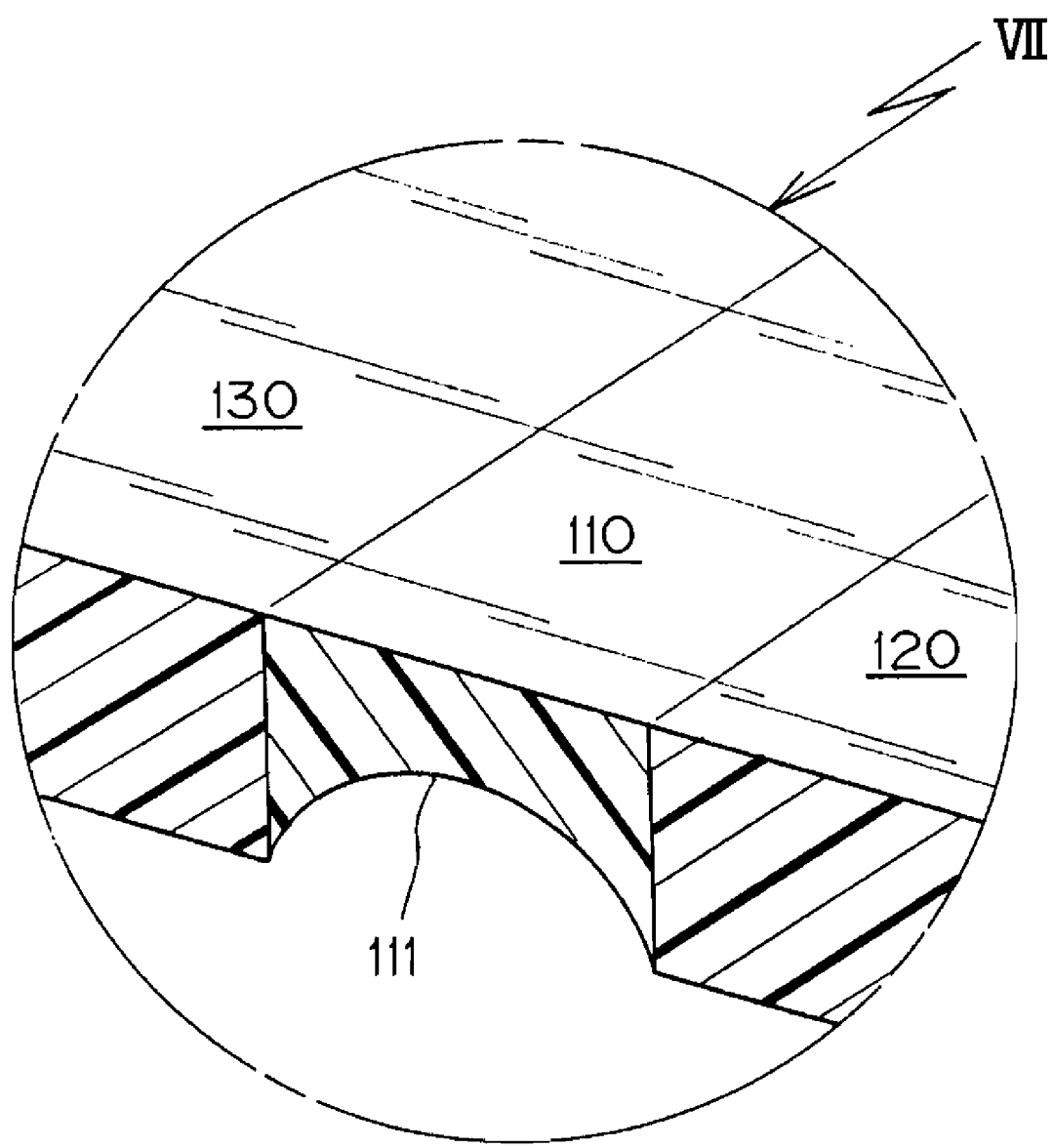
FIG. 7 is an enlarged view showing the portion VII in FIG. 4.
Figure 8:
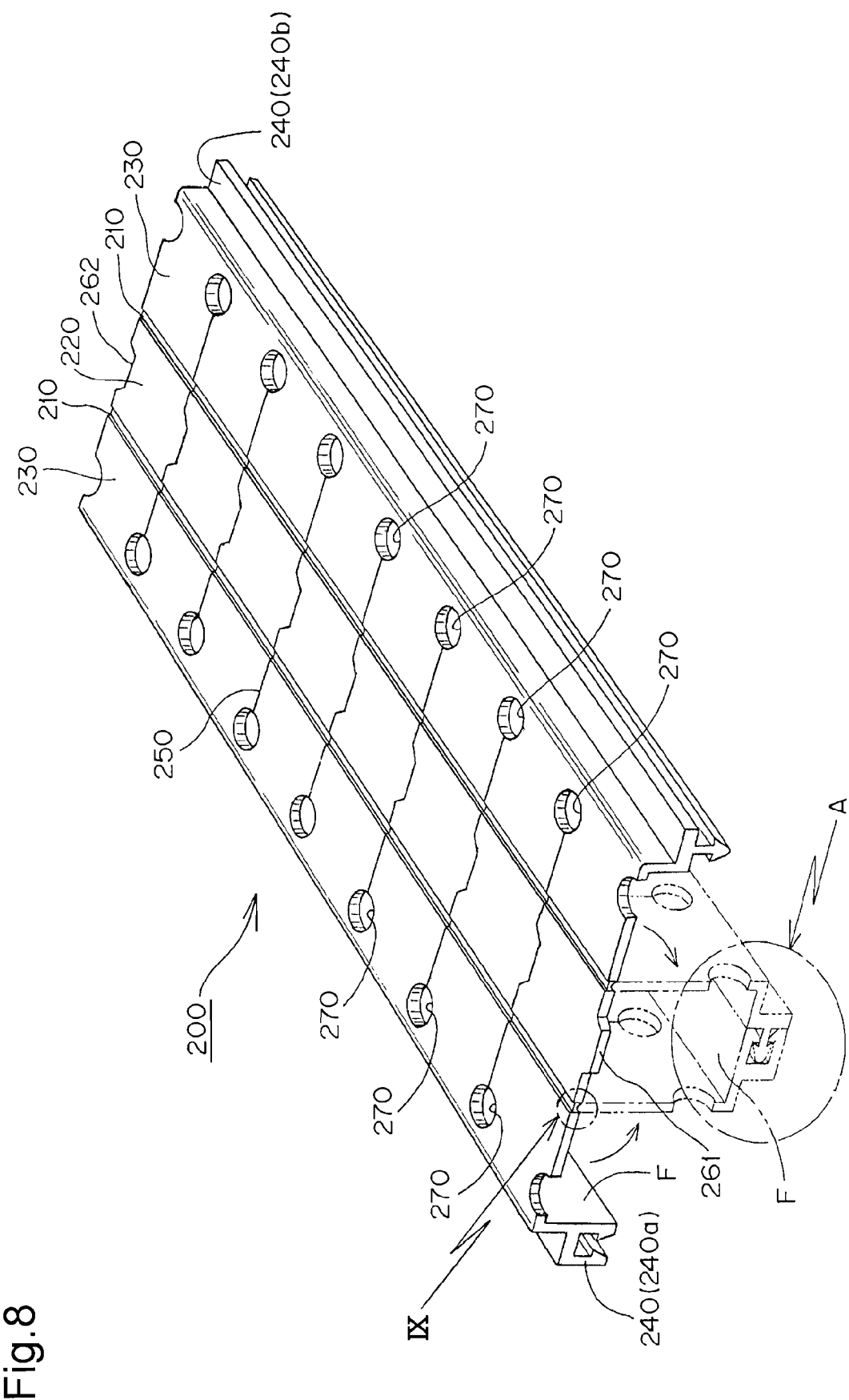
FIG. 8 is a development view of an elastomer resin sheet, which is a second example of the present invention.
Figure 9:
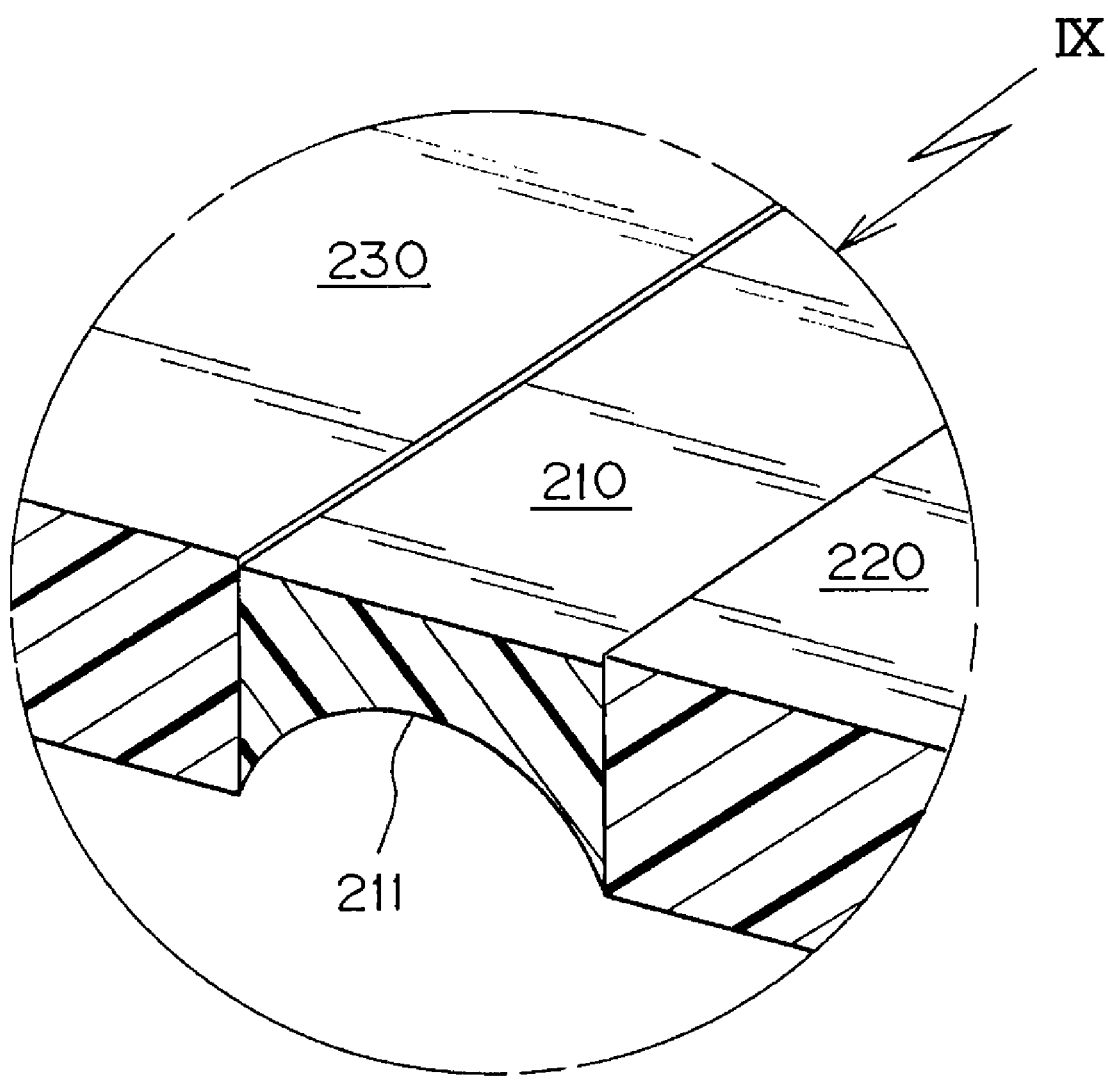
FIG. 9 is an enlarged view showing the portion IX in FIG. 8.

FIG. 1 is a whole view of a tube type cable or the like protection and guide device which is a first example according to the present invention. FIG. 2 is an enlarged perspective view of a linear state of FIG. 1. FIG. 3 is an enlarged perspective view of a flexed state of FIG. 1. FIG. 4 is a development view of an elastomer resin sheet used in FIG. 1. FIGS. 5 and 6 are enlarged views of modified examples showing the portion A in FIG. 4. FIG. 7 is an enlarged view showing the portion VII in FIG. 4. FIG. 8 is a development view of an elastomer resin sheet of a tube type cable or the like protection and guide device which is a second example of the present invention. FIG. 9 is an enlarged view showing the portion IX in FIG. 8.

The tube type cable protection and guide device which is the first example of the present invention is used for protecting and guiding cables or the like C such as electric cables. The cables connect between movable and stationary portions in a semiconductor device. A pharmacy development testing device, a vehicle door opening/closing device, a vehicle slide seat, and a vehicle electric sunroof are examples of applications for the cable protection and guide device. The cables carry out transmission and supply of electric signals. Hoses which supply liquid or gas pressure may also be used in the cable protection and guide device. The cables and hoses may assume a linear or flexional position in accordance with the position of the movable portion with respect to the stationary portion (not shown). As shown in FIG. 1 to 3, the tube type cable protection and guide device is formed in such a manner that an elongated elastomer resin sheet 100 accommodates cables C along the longitudinal direction of the sheet in a cable accommodating space R of a rectangular cross-section. The cable accommodating space is formed by folding the elongated elastomer resin sheet 100 into a pair of right and left folding portions 110. The elastomer resin sheet is extrusion molded in the longitudinal direction of the sheet. Linear and flexional movements of the cable protection and guide device are repeated.

The elastomer resin sheet 100 as shown in FIG. 4 includes outer circumferential wall forming portions 120 which adjacently engage each other in a longitudinal direction of the sheet during linear movement and are separated from each other at predetermined pitches in the longitudinal direction of the sheet during flexional movement. A pair of right and left side wall forming portions 130, 130 are adjacently disposed on both sides of the outer circumferential wall forming portion 120 so that the side wall forming portions adjacently engage each other in the longitudinal direction of the sheet during linear movement and are separated from each other at predetermined pitches in the longitudinal direction of the sheet during flexional movement. A pair of right and left pair of inner circumferential wall forming portions 140 are integrally molded with the pair of right and left side wall forming portions 130, 130. The inner circumferential wall forming portions 140 are disposed opposite the outer circumferential wall forming portion 120 in an interdigitatedly fitted manner along the longitudinal direction and forming the cable accommodating space R.

The inner circumferential wall forming portions 140 will be described in more detail. The inner circumferential wall forming portions 140 include a female inner circumferential wall portion 140a and a male inner circumferential wall portion 140b which fits to this female inner circumferential wall portion 140a in a concave element/convex element engagement. Male inner circumferential wall portion 140b interfits with female inner circumferential wall portion 140b in a male/female engagement and at the same time forms a flush inner flat surface F oppositely disposed from the outer circumferential wall forming portion 120. Therefore, the inner flat surface F is one of the surfaces which form the cable accommodating space R. The fitting of the male and female inner circumferential wall forming portions can be reliably attained in a flush manner which will not interfere with the protection and guidance of the cables C during both linear movement and flexional movement.

The opening and closing of the inner circumferential wall forming portions 140 composed of the female inner circumferential wall portion 140a and the male inner circumferential wall portion 140b, which are interdigitatedly fitted to each other, is easy. Accommodation of the cable is good and maintenance of the device is easy. At the same time compressive stress due to the flexional deformation during the flexional movement and weight of the cables C acts on such inner circumferential wall forming portions 140 and improves the fitting force for the interdigitated fitting (female element/male element fitting). Therefore, the stability and torsional rigidity of the inner and outer circumferential wall forming portions and side wall forming portions cable is good during linear and flexional movement of the cable protection and guide device. As such the cable accommodating space R maintains its rectangular cross-section during linear and flexional movement.

FIG. 5(a) is an enlarged view showing the portion A in FIG. 4. FIGS. 5(b) and 5(c) are enlarged views of modified examples of the portion A which form inner flat surfaces F in a flush manner in the inner circumferential wall forming portion 140. FIGS. 6(a) to 6(c) are enlarged views of modified examples which form inner flat surfaces F in a flush manner in the inside and the outside of the inner circumferential wall forming portion 140 by changing the design of portion A in FIG. 4. Many other connection examples not illustrated of the male/female interconnection of inner wall forming portion 140 are specifically contemplated.

The above-described folding portion 10 includes a folding strain suppression opening groove 111 composed of an arc-shaped grooved as shown in FIG. 7. The opening groove 111 is located inside the folding portion 10 and extends in the longitudinal direction of the sheet. A cable accommodating space R of rectangular cross-section can be uniformly and reliably shaped in accordance with the required size along the longitudinal direction of the sheet.

Further, in the elastomer resin sheet 100 in this example, since the above-described outer circumferential wall forming portion 120, the side wall forming portion 130 and the inner circumferential portion 140 are molded of polyurethane resin, extrusion molding and punching (to be described later in detail) are easily performed. Thus, the elastomer resin sheet 100 of polyurethane exhibits sufficient rigidity such that the form stability of the cable accommodating space R is ensured.

Further, if the cable C to be accommodated into the cable accommodating space R is long, the elastomer resin sheet 100 is cut as a continuous integral body in accordance with the length required.

Further, the split slits 150, which separates the outer circumferential wall forming portions 120 and pairs of right and left side wall forming portions 130, 130 of the elastomer resin sheet 100 from each other at predetermined pitches in a longitudinal direction of the sheet during flexional movement are created by punching in such a manner that the split slits 150 traverse the folding portions 110 at predetermined pitches while leaving the pairs of right and left inner circumferential forming portions 140, 140 intact and uncut.

In the elastomer resin sheet 100 punching (cutting) intervals for forming the split slits 150 can be appropriately selected. Thus the flexion pitch for forming the cable accommodating space R can be variously changed.

Further, the front and back positions of the split slit 150 in the outer circumferential wall forming portion 120 include a concave element/convex element engagement mechanism 160 comprising a trapezoidal tongue-shaped convex portion 161 and a reverse trapezoidal tongue-shaped concave portion 162. The trapezoidal tongue-shaped convex portion 161 engages the tongue-shaped concave portion 162 under certain conditions. The concave element/convex element engagement mechanism 160 restricts a lateral shift of the outer circumferential wall forming portion at front and rear positions of the split slit 150 during linear movement so that smooth linear movement is attained while avoiding a snaking movement.

Circular openings 170 are provided in the side wall forming portions 130. Split slits 150 terminate in the circular openings 170. The circular openings 170 are provided by punching them out of the extrusion.

Circular openings 170 absorb strain deformation of the cable accommodating space R liable to occur due to an internal movement of cables or the like C during linear and flexional movement. Circular opening thus ensure excellent shape retention and contribute to light weight of the cable protection and guide device. Additionally, these openings 170 allow visual observation of the cables or the like C accommodated in the cable accommodating space R.

The cable or the like protection and guide device of the present example may be cut from an elastomer resin sheet 100 to form a continuous integrated body in accordance with the optimal length required. Thus, assembly is simplified and it is not necessary to connect a number of link plates as is done in conventional protection and guide chains to form a device having the desired length. Further, formation of the elastomer resin sheet 100 is performed by extruding polyurethane and the like and there is no need for various mold sizes used in injection molding or casting processes. Thus even if the elastomer resin sheet 100 is long, it can be easily manufactured without the need to change the mold size. The elastomer resin sheet 100 includes inner circumferential wall forming portions 140 formed such that each inner circumferential wall forming portion is integrally molded in the pair of right and left side wall forming portions 130. Each of the inner circumferential wall forming portions is closed in an interdigitatedly fitted manner along the longitudinal direction of the sheet and form a cable accommodating space R.

Opening and closing of the inner circumferential wall forming portions 140 which are interdigitatedly fitted to each other is easy. Thus the accommodation of the cables or the like C and maintenance of the device can be easily attained. At the same time compressive stress due to the flexional deformation and weight of the cables or the like C acts on the interdigitatedly fitted inner circumferential wall forming portions 140 so that fitting force for the interdigitated fitting (female element and male element fitting) is improved. Therefore, the stability and torsional rigidity of the walls forming the cable accommodating space R are sufficiently ensured during both linear and flexional movement. In this way smooth linear and flexional movement of the device can be attained. Thus the effects of the first example are very large.

Next, FIGS. 8 and 9 show an elastomer resin sheet 200 used in a tube type cable or the like protection and guide device, which is a second example according to the present invention. The elastomer resin sheet 200 adopts an elastomer resin made of a hard polyurethane resin in an outer circumferential forming portion 220 and a side wall forming portion 230 and at the same time adopts a soft elastomer resin for use in a folding portion 210 and an inner circumferential wall forming portion 240. Multi-color molding is performed. The remaining configuration is the same as in the elastomer resin sheet 100 used in the above-described first example.

It is noted that the same elements in the tube type cable or the like protection and guide device which is the second example shown in FIGS. 8 and 9, are denoted similarly as set forth in the first example, so that, for example, the reference numeral 110 is denoted by a reference numeral 210. Thus a repetitive description of similar components is omitted.

Since the tube type cable or the like protection and guide device which is the second example of the present invention can exhibit the same action and effects as in the tube type cable or the like protection and guide device of the first example of the present invention, the folding portion 210 is molded of a soft elastomer resin and the folding portion 210 exhibits relatively more flexibility than the outer circumferential wall forming portion 220 and the side wall forming portion 230 so that resilience, which is generated at the time of folding, is reduced. Thus the tube type cable or the like protection and guide device, which is the second example of the present invention, is deformed without generating excessive strain in a connection regions between an outer circumferential wall forming portion 220 and side wall forming portions 230 so that flexion can be smoothly performed. Thus the effects of the second example are very large.

DESCRIPTION OF REFERENCE NUMERALS 100, 200 . . . Elastomer resin sheet
110, 210 . . . Folding portion
111, 211 . . . Arc-shaped groove (folding strain suppressing opening groove)
120, 220 . . . Outer circumferential wall forming portion
130, 230 . . . Side wall forming portion
140, 240 . . . Inner circumferential wall forming portion
140a, 240a . . . Female type inner circumferential wall portion
140b, 240b . . . Male type inner circumferential wall portion
150, 250 . . . Split slit
160, 260 . . . Concave element/convex element engagement mechanism
161, 261 . . . Trapezoidal tongue piece convex portion
162, 262 . . . Reverse trapezoidal tongue-shaped concave portion
170, 270 . . . Opening
C . . . Cable (Cables) or the like
R . . . Cable accommodating space
F . . . Inner flat surface

The invention claimed is:

1. A tube type cable protection and guide device, comprising,
an extrusion molded elongated elastomer resin sheet folded on both sides thereof in a longitudinal direction of said sheet;
a cable accommodated in a cable accommodating space formed by folding said elastomer resin sheet;
said elastomer resin sheet repeatedly moves linearly and flexionally,
said elastomer resin sheet includes outer circumferential wall forming portions adjacently engaging each other in said longitudinal direction of said sheet during linear movement;
said outer circumferential wall forming portions are separated from each other at predetermined pitches in said longitudinal direction of said sheet during flexional movement;
a pair of right and left side wall forming portions are continuously disposed on both sides of said outer circumferential wall forming portions so that the side wall forming portions adjacently engage each other in said longitudinal direction of said sheet during linear movement;
said pair of right and left side wall forming portions are separated from each other at predetermined pitches in said longitudinal direction of said sheet during flexional movement; and,
inner circumferential wall forming portions are integrally molded with said pair of right and left side wall forming portions and form a flush inner flat surface oppositely disposed from said outer circumferential wall forming portion by closing and interdigitatedly fitting said inner circumferential wall forming portions to each other along said longitudinal direction of said sheet thus forming said cable accommodating space.

2. A tube type cable protection and guide device according to claim 1, wherein said elastomer resin sheet is folded, and, said pair of right and left side wall folded portions extend in said longitudinal direction of said sheet along both sides of said outer circumferential wall forming portion to form a cable accommodating space of rectangular cross-section.

3. A tube type cable protection and guide device according to claim 1, further comprising:
a split slit;
said split slit separates said outer circumferential forming portion and said pair of right and left wall forming portions of said elastomer resin sheet from each other at predetermined pitches in said longitudinal direction of said sheet during flexional movement; and,
said split slit traverses said outer circumferential forming portion at predetermined pitches and splits and separates said outer circumferential forming portion and said pair of right and left wall forming portions of said elastomer resin sheet while leaving a pair of right and left inner circumferential forming portions intact.

4. A tube type cable protection and guide device according to claim 2, further comprising:
a split slit;
said split slit separates said outer circumferential forming portion and said pair of right and left wall forming portions of said elastomer resin sheet from each other at predetermined pitches in said longitudinal direction of said sheet during flexional movement;
said split slit traverses said outer circumferential forming portion at predetermined pitches and splits and separates said outer circumferential forming portion and said pair of right and left wall forming portions of said elastomer resin sheet while leaving a pair of right and left inner circumferential forming portions intact.

5. A tube type cable protection and guide device according to claim 3, wherein said split slit in said outer circumferential wall includes front and rear positions and a concave portion/convex portion engagement mechanism which restricts a lateral shift during linear movement.

6. A tube type cable protection and guide device according to claim 4, wherein said split slit in said outer circumferential wall includes front and rear positions and a concave portion/convex portion engagement mechanism which restricts a lateral shift during linear movement.

7. A tube type cable protection and guide device according to claim 2 wherein said folded portion includes an arc-shaped groove or a V-shaped groove opened on the inside thereof and along said longitudinal direction of said sheet.

8. A tube type cable protection and guide device according to claim 2 wherein said folded portion is molded of a soft elastomer resin.

9. A tube type cable protection and guide device according to claim 1, wherein said inner circumferential wall forming portion is integrally molded by multi-color molding using a synthetic polymer resin different from said elastomer resin.

10. A tube type cable protection and guide device according to claim 2, wherein said inner circumferential wall forming portion is integrally molded by multi-color molding using a synthetic polymer resin different from said elastomer resin.

11. A tube type cable protection and guide device according to claim 3, wherein said inner circumferential wall forming portion is integrally molded by multi-color molding using a synthetic polymer resin different from said elastomer resin.

12. A tube type cable protection and guide device, comprising,
- an extrusion molded elongated elastomer resin sheet folded on both sides thereof in a longitudinal direction of said sheet;
- a cable accommodated in a cable accommodating space formed by folding said elastomer resin sheet;
- said elastomer resin sheet repeatedly moves linearly and flexionally,
- said elastomer resin sheet includes outer circumferential wall forming portions adjacently engaging each other in said longitudinal direction of said sheet during linear movement;
- said outer circumferential wall forming portions are separated from each other at predetermined pitches in said longitudinal direction of said sheet during flexional movement;
- a pair of right and left side wall forming portions are continuously disposed on both sides of said outer circumferential wall forming portions so that the side wall forming portions adjacently engage each other in said longitudinal direction of said sheet during linear movement;
- said pair of right and left side wall forming portions are separated from each other at predetermined pitches in said longitudinal direction of said sheet during flexional movement;
- inner circumferential wall forming portions are integrally molded with said pair of right and left side wall forming portions and form a flush inner flat surface oppositely disposed from said outer circumferential wall forming portion by closing and interdigitatedly fitting said inner circumferential wall forming portions to each other along said longitudinal direction of said sheet thus forming said cable accommodating space;
- said pair of right and left side wall folded portions extend in said longitudinal direction of said sheet along both sides of said outer circumferential wall forming portion to form a cable accommodating space of rectangular cross-section;
- a split slit;
- said split slit separates said outer circumferential forming portion and said pair of right and left wall forming portions of said elastomer resin sheet from each other at predetermined pitches in said longitudinal direction of said sheet during flexional movement;
- said split slit traverses said outer circumferential forming portion at predetermined pitches and splits and separates said outer circumferential forming portion and said pair of right and left wall forming portions of said elastomer resin sheet while leaving a pair of right and left inner circumferential forming portions intact; and,
- said inner circumferential wall forming portion is integrally molded by multi-color molding using a synthetic polymer resin different from said elastomer resin.

* * * * *

UNITED STATES PATENT AND TRADEMARK OFFICE
CERTIFICATE OF CORRECTION

| | |
|---|---|
| PATENT NO. | : 7,559,340 B2 |
| APPLICATION NO. | : 12/024805 |
| DATED | : July 14, 2009 |
| INVENTOR(S) | : Ikeda et al. |

Page 1 of 1

It is certified that error appears in the above-identified patent and that said Letters Patent is hereby corrected as shown below:

Col. 7, line 29, after "portion" delete "10" and insert --110--.

Signed and Sealed this

Eighteenth Day of August, 2009

David J. Kappos
*Director of the United States Patent and Trademark Office*